(12) United States Patent
Nickerson et al.

(10) Patent No.: US 10,083,480 B2
(45) Date of Patent: Sep. 25, 2018

(54) SYSTEMS AND METHODS FOR FACILITATING A TRANSACTION RELATING TO NEWLY IDENTIFIED ITEMS USING AUGMENTED REALITY

(71) Applicant: CAPITAL ONE SERVICES, LLC, McLean, VA (US)

(72) Inventors: Karen Nickerson, Chicago, IL (US); Justin Wishne, Chicago, IL (US); Drew Jacobs, Arlington, VA (US); Justin Smith, Chicago, IL (US); Marco S. Giampaolo, Berwyn, IL (US); Hannes Jouhikainen, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/969,909

(22) Filed: May 3, 2018

(65) Prior Publication Data
US 2018/0247370 A1 Aug. 30, 2018

Related U.S. Application Data

(63) Continuation of application No. 15/667,043, filed on Aug. 2, 2017, now Pat. No. 10,007,948.
(Continued)

(51) Int. Cl.
*G06Q 30/06* (2012.01)
*G06F 3/16* (2006.01)
(Continued)

(52) U.S. Cl.
CPC ......... *G06Q 30/0643* (2013.01); *G06F 3/011* (2013.01); *G06F 3/017* (2013.01);
(Continued)

(58) Field of Classification Search
CPC ....................................................... G06Q 30/06
(Continued)

(56) References Cited

U.S. PATENT DOCUMENTS

| 2011/0187745 | A1* | 8/2011 | Kang | G06F 17/30241 345/633 |
| 2014/0058863 | A1 | 2/2014 | Biswas et al. | |

(Continued)

*Primary Examiner* — Mila Airapetian
(74) *Attorney, Agent, or Firm* — Troutman Sanders LLP; Christopher J. Forstner; John A. Morrissett

(57) ABSTRACT

A system may provide an augmented environment that facilitates a transaction. The system may store profile data including user payment or user profile information. The system may then receive environmental data including audio and visual information representing a physical environment. The system may then receive first user input data indicative of a selection of one or more items present in the physical environment, and identify one or more action items in the environmental data based on the first user input data. In response to this identification, the system may augment the environmental data by adding virtual environmental data, and then provide this virtual environmental data to a device to create an augmented environment. The system can then receive second user input data, and provide purchase request data to a merchant terminal to enable a transaction related to the one or more action items.

20 Claims, 5 Drawing Sheets

Related U.S. Application Data

(60) Provisional application No. 62/437,711, filed on Dec. 22, 2016.

(51) Int. Cl.
*G06K 9/00* (2006.01)
*G06F 3/01* (2006.01)
*G06Q 20/40* (2012.01)
*G06Q 20/20* (2012.01)
*G06F 3/0484* (2013.01)

(52) U.S. Cl.
CPC ........... *G06F 3/16* (2013.01); *G06K 9/00671* (2013.01); *G06Q 20/202* (2013.01); *G06Q 20/4014* (2013.01); *G06Q 30/0633* (2013.01); *G06F 3/04842* (2013.01)

(58) Field of Classification Search
USPC ....................................................... 705/26.1
See application file for complete search history.

(56) References Cited

U.S. PATENT DOCUMENTS

| | | | |
|---|---|---|---|
| 2014/0210322 A1* | 7/2014 | Roberts | A47F 9/02 312/10.1 |
| 2014/0258024 A1 | 9/2014 | Akin | |
| 2014/0279426 A1 | 9/2014 | Holman et al. | |
| 2014/0365336 A1* | 12/2014 | Hurewitz | G06Q 30/0643 705/26.62 |
| 2017/0097679 A1 | 4/2017 | Kempinski | |
| 2017/0265027 A1 | 9/2017 | Najari et al. | |

* cited by examiner

SYSTEMS AND METHODS FOR FACILITATING A TRANSACTION RELATING TO NEWLY IDENTIFIED ITEMS USING AUGMENTED REALITY

CROSS-REFERENCE TO RELATED APPLICATION

This application is a continuation of U.S. patent application Ser. No. 15/667,043, filed Aug. 2, 2017, entitled "SYSTEMS AND METHODS FOR FACILITATING A TRANSACTION RELATING TO NEWLY IDENTIFIED ITEMS USING AUGMENTED REALITY", which claims the benefit of U.S. Provisional Application No. 62/437,711, filed Dec. 22, 2016, the entire contents and substance of which is hereby incorporated by reference.

FIELD OF INVENTION

The present disclosure relates to systems and methods for facilitating a transaction using augmented reality, and more particularly facilitating a transaction relating to one or more newly identified items using an interactive augmented environment.

BACKGROUND

Most people routinely see items that they are interested in purchasing in locations outside of a merchant or storefront. For example, a first person may be walking down the street and see an item of interest, such as a particular shirt that a second person is wearing or a handbag the second person is carrying, and the first person may desire to purchase the shirt or handbag for themselves. However, typically there is no way for an individual to immediately purchase items that they see as they move through the world outside of the merchant or shopping location. When coming across a desired item, a person must generally identify the item, remember it, and locate a merchant to purchase the item from at a later time. While this tedious process is manageable for a single item of note (e.g., an automobile purchase) or when it is convenient to purchase the item immediately or shortly after identifying it (e.g., while at or en route to the merchant location), it can be oftentimes burdensome for a person to accurately identify the item (e.g., the brand or model) or several items, identify a merchant that sells the identified item(s), and remember that information later on when the person can conveniently purchase the item(s), particularly if the person is involved in another non-shopping task when coming across the item(s).

Accordingly, there is a need for systems and methods for facilitating a transaction of previously unidentified items using augmented reality or virtual reality. Such systems can be non-invasive to an individual's day and can provide the ability to identify items of interest and complete transactions instantaneously. Embodiments of the present disclosure are directed to this and other considerations.

SUMMARY

Disclosed embodiments provide systems and methods for facilitating a transaction using augmented reality.

Consistent with the disclosed embodiments, the system may include one or more memory devices storing instructions, and one or more processors configured to execute the instructions to perform steps of a method to facilitate a transaction using augmented reality. The system may store profile data including user payment or other profile information. The system may then receive environmental data that may include audio and visual information representing a physical environment. The system may receive first user input data indicative of a selection of one or more items present in the physical environment, and identify one or more action items in the environmental data based on the first user input data. In response to this identification, the system may augment the environmental data by adding virtual environmental data, and then provide this virtual environmental data to a device. The system can then receive second user input data, and provide purchase request data to a merchant terminal to complete a transaction based on the second user input data, the one or more action items, and the user profile information.

Consistent with the disclosed embodiments, methods for providing an augmented environment that facilitates a transaction are also provided.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
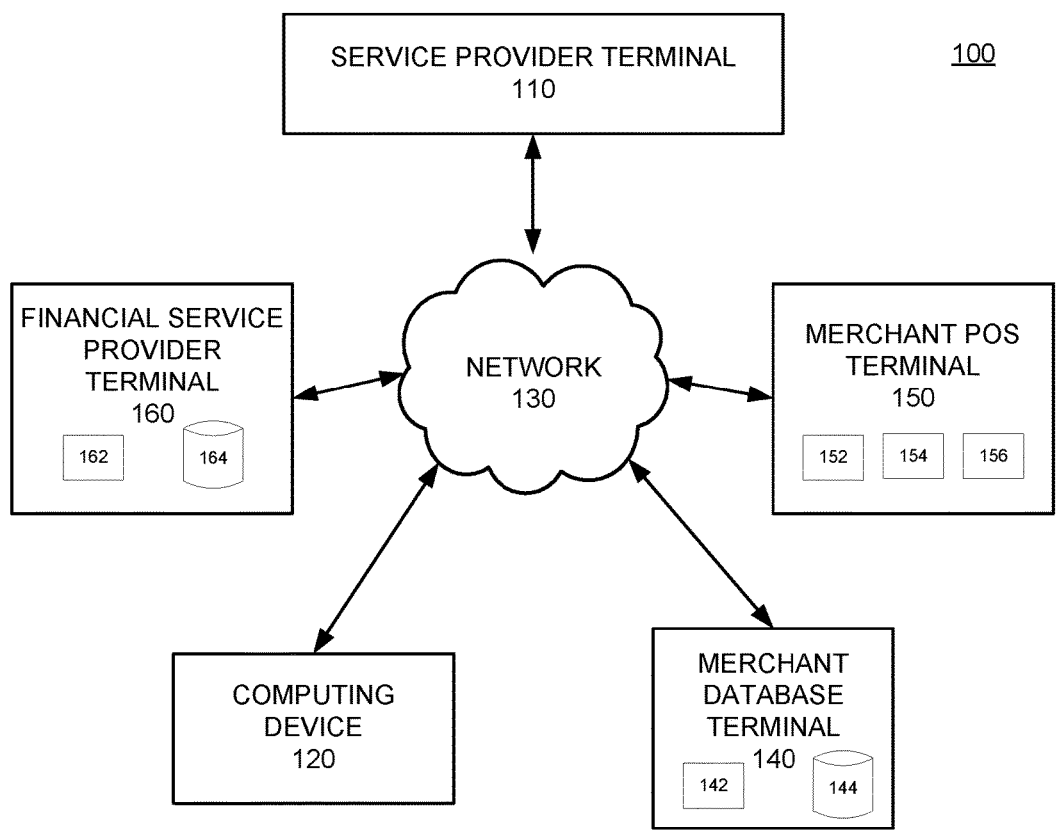
FIG. 1 is a diagram of an exemplary system that may be used to generate an augmented environment and facilitate a transaction.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for generating an augmented environment and facilitating a transaction. The system may include one or more memory devices storing instructions, and one or more processors configured to execute the instructions to perform steps of a method. Specifically, in some embodiments, the system may provide an augmented environment that facilitates a transaction. To accomplish this, the system may execute the instructions to store profile data including user payment or other profile information. The system may then receive environmental data that may include audio and visual information representing a physical environment. The system may receive first user input data indicative of a selection of one or more items present in the physical environment, and identify one or more action items in the environmental data based on the first user input data. In response to this identification, the system may augment the environmental data by adding virtual environmental data, and then provide this virtual environmental data to a device. Having provided the virtual data to the computing device, the system may then receive second user input data and provide purchase request data to a merchant terminal to complete a transaction based on the second user input data, the one or more action items, and the user profile information.

In another embodiment, a system for facilitating a transaction may include a memory for storing profile data comprising user payment credentials and user profile information. The system may include an environmental data sensor for obtaining environmental data comprising audio and/or visual information representing a physical environment. The system may include a user interface device for generating user input data in response to one or more user inputs that may include first user input data indicative of a selection of one or more items present in the physical environment. The system may include an input/output device for transmitting the purchase request data to a merchant terminal. The system may further include an augmented environment processor that, based on the first user data and environmental data obtained from the environmental data sensor, may identify one or more action items in the environmental data that are associated with the one or more selected items, augment the environmental data by adding the virtual environmental data comprising enhanced content associated with one or more of the one or more action items, generate a signal comprising augmented environmental data, and generate purchase request data based on the one or more action items, the user profile information, and second user input data associated with one or more action items generated by the user interface device. Enhanced content may be content that is unrepresented in the physical environment. The system may further include an augmented environmental data display that may receive the signal comprising augmented environmental data and display said augmented environmental data in accordance with said signal.

In another aspect, a non-transitory computer-readable medium storing instructions is disclosed. The instructions, when executed by one or more processors, may cause a computing device to perform steps of a method for generating an augmented environment and facilitating a transaction. Specifically, the computing device may store profile data including user payment or other profile information and receive environmental data. The system may receive environmental data that may include audio and visual information representing a physical environment. The computing device may then receive first user input data indicative of a selection of one or more items present in the physical environment, and identify one or more action items in the environmental data. This identification can result in the system augmenting the environmental data by adding virtual environmental data, and then providing this virtual environmental data to a device. The computing device may then receive second user input data, and provide purchase request data to a merchant terminal to complete a transaction based on the second user input data, the one or more action items, and the user profile information.

In another aspect, a method for facilitating a transaction using augmented reality is disclosed. The disclosed method can include storing profile data including user payment or other profile information. Next, the method may include receiving environmental data that may include audio and visual information representing a physical environment. The method may include receiving first user input data indicative of a selection of one or more items present in the physical environment, and identifying one or more action items in the environmental data based on the first user input data. In response to this identification, the method may include augmenting the environmental data by adding virtual environmental data, and then providing this virtual environmental data to a computing device. Having provided the virtual data to the computing device, the method may include receiving second user input data and providing purchase request data to a merchant terminal to complete a transaction based on the second user input data, the one or more action items, and the user profile information.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can generate interactive virtual elements to augment an environment. The components and arrangements shown in FIG. 1 are not intended to limit the disclosed embodiments as the components used to implement the disclosed processes and features may vary.

In accordance with disclosed embodiments, transaction facilitating system 100 may include a service provider terminal 110 in communication with a computing device 120 via network 130. In some embodiments, service provider terminal 110 is also in communication with a merchant database terminal 140 via network 130. Computing device 120 may be a mobile computing device (e.g., a smart phone, tablet computer, smart wearable device, portable laptop computer, voice command device, or other mobile computing device) or a stationary computing device (e.g., a stationary desktop or other stationary computer). Computing device 120 may belong to or be provided by a consumer, or may be borrowed, rented, or shared. In some embodiments, computing device 120 may be configured to provide one or more of an augmented reality and/or a virtual reality experience to one or more users, and may be equipped with a visual display (which may be referred to as a "display"), speakers or other auditory devices, tactile simulators, and other devices configured to engage the user's senses to enhance the augmented/virtual reality experience.

In some embodiments, transaction facilitating system 100 may connect to a merchant database terminal 140 that communicates with other devices of system 100 via network 130. Optionally, in some embodiments, interactive virtual/augmented environment system 100 may also include a merchant point of sale (POS) terminal 150 that communicates with other devices of system 100 via network 130. Additionally, in some embodiments, interactive virtual/augmented environment system 100 may also include a financial service provider terminal 160 that communicates with other devices of system 100 via network 130.

Network 130 may be of any suitable type, including individual connections via the internet such as cellular or WiFi networks. In some embodiments, network 130 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
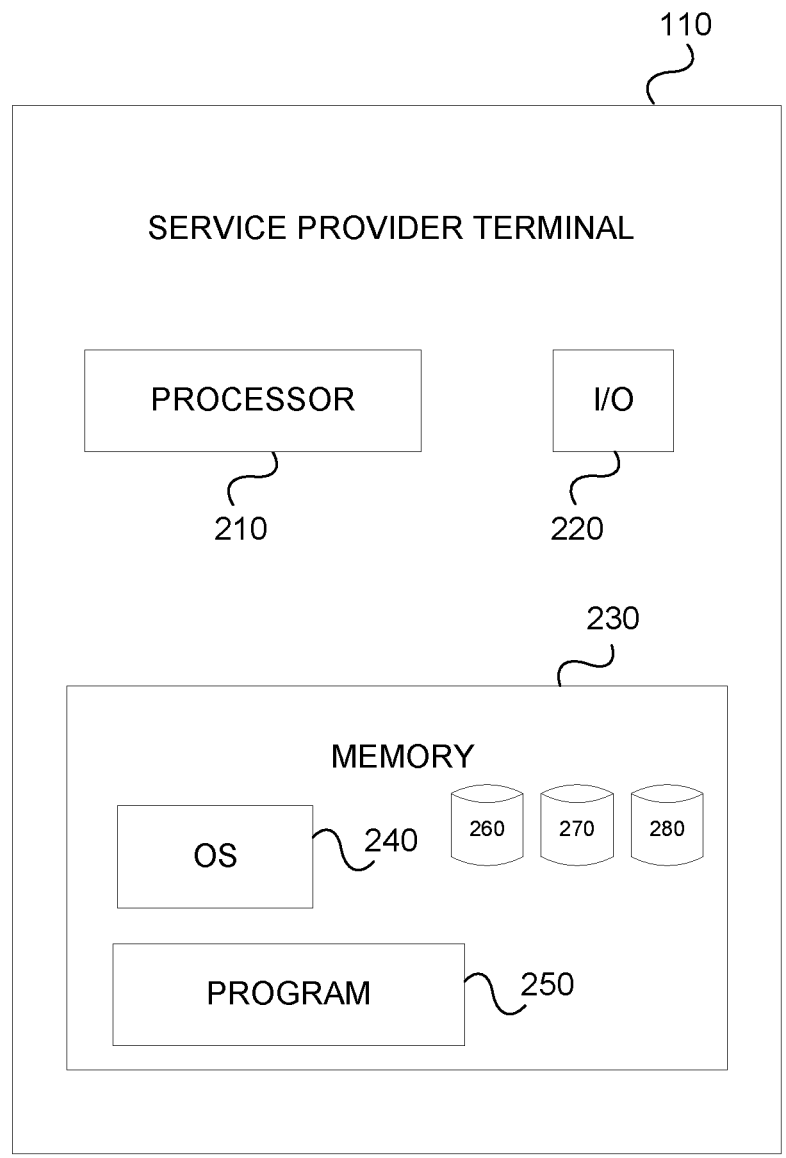
FIG. 2 is a component diagram of an exemplary service provider terminal.

An exemplary embodiment of service provider terminal 110 is shown in more detail in FIG. 2. Computing device 120, merchant database terminal 140, merchant POS terminal 150, and financial service provider terminal 160 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, the service provider terminal 110 may further include a peripheral interface, a transceiver, a mobile network interface in communication with the processor 210, a bus configured to facilitate communication between the various components of the service provider terminal 110, and a power source configured to power one or more components of the service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a merchant information database 260, an environment database 270, and a virtual environmental database 280 for storing related data to enable service provider terminal 110 to perform one or more of the processes and functionalities associated with the disclosed embodiments. Merchant information database 260 may include stored data relating to product price, product inventory, related products, and available discounts associated with one or more products associated with one or more merchants. Environment database 270 may include stored data relating to a physical environment that is captured by one or more devices (e.g., computing device 120) of system 100. Virtual environment database 280 may include stored data relating to a virtual environment that is provided to and can be updated based upon interactions with one or more devices (e.g., computing device 120) of system 100.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via computing device 120).

In exemplary embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Merchant database terminal 140 may have one or more processors 142 and one or more merchant databases 144, which may be any suitable repository of merchant data. Merchant database terminal 140 may be located at the POS location, off-site at another merchant location, or at a third party location. Information stored in merchant database terminal 140 may be accessed (e.g., retrieved, updated, and added to) via network 130 by one or more devices (e.g., service provider terminal 110) of system 100. Merchant database 144 may store information relating to products and services offered by merchants such as pricing, quantity, availability, discounts, reviews, and any other such information that a consumer may utilize in making a purchasing decision. In some embodiments, merchant database 144 may also include location information associated with products and services that identifies the location(s) that a particular product or service is available for purchase. In some embodiments, the location information may include an identification of a particular store, terminal, or kiosk that the product or service may be purchased from.

Merchant POS terminal 150 may have one or more POS devices 152, 154, 156 that communicate with one or more devices (e.g., computing device 120) of system 100 via network 130. In some embodiments, POS devices 152, 154, 156 may be associated with one or more products or items at a POS location, and may serve as beacons to identify the associated products or items and related information to one or more devices of system 100. In other embodiments, merchant POS terminal 150 may be configured to process online transactions on behalf of the associated merchant.

Financial service provider terminal 160 may have one or more processors 162 and one or more financial service provider databases 164, which may be any suitable repository of merchant data. Financial service provider terminal 160 may be located at the POS location, off-site at another financial service provider location, or at a third party location. Information stored in financial service provider database 164 may be requested and sent to one or more devices (e.g., service provider terminal 110, merchant POS terminal 150) of system 100 via network 130.

Figure 5:
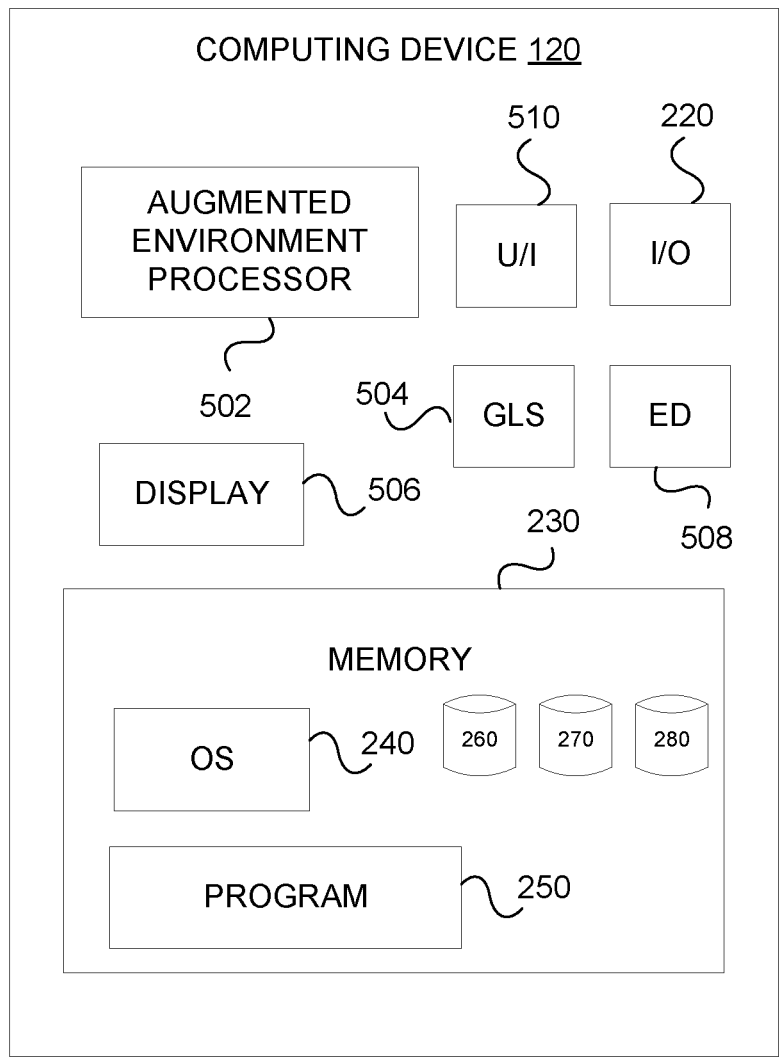
FIG. 5 is a component diagram of an exemplary computing device.

FIG. 5 shows an exemplary embodiment of computing device 120. As shown, computing device 120 may include input/output ("I/O") device 220 for transmitting purchase request data to a merchant POS terminal 150, memory 230 for storing profile data comprising user payment credentials and user profile information and containing operating system ("OS") 240 and program 250 and all associated components as described above with respect to service provider terminal 110. Computing device 120 may also have one or more processors, including an augmented environment processor 502 for generating signals representative of augmented and/or virtual environments, a geographic location sensor ("GLS") 504 for determining the geographic location of computing device 120 and/or an associated environmental data sensor 508, an augmented environmental data display 506 for displaying augmented environmental data, an environmental data ("ED") sensor 508 for obtaining environmental data including audio and/or visual information representing a physical environment, and a user interface ("U/I") device 510 for receiving user input data associated with one or more action items. According to some embodiments, a user interface device 510 may include some or all of the components described with respect to input/output device 220 above. In some embodiments, environmental data sensor 508 may include a microphone or a digital camera. According to some embodiments, augmented environment processor 502 may include all of the features and functions of processor 210 described above. Further, augmented environment processor 502 may be configured to, based on the first user data and environmental data obtained from the environmental data sensor, identify one or more action items in the environmental data that are associated with the one or more selected items (e.g., environment processor 502 may apply image recognition techniques to an object that a user made a gesture towards), augment the environmental data by adding the virtual environmental data comprising enhanced content associated with one or more of the one or more action items (e.g., environment processor 502 may associate merchant information with an identified item), generate a signal comprising augmented environmental data, and generate purchase request data based on the one or more action items, the user profile information, and second user input data associated with one or more action items generated by the user interface device. Enhanced content may be content that is unrepresented in the physical environment. The augmented environmental data display 506 may be configured to receive the signal comprising augmented environmental data and display the augmented environmental data in accordance with the signal.

According to some embodiments, based on the user input data, the one or more action items, and the user profile information, the input/output device 220 may be configured to provide purchase request data to a merchant terminal 150 to enable a transaction related to the one or more action items, wherein the purchase request data comprises the stored user payment credentials. In some embodiments, the first user input data may be generated in response to a first gesture indicating selection of an item that is present in the physical environment. In some embodiments, the second user input data may be generated in response to a second gesture indicating an instruction to purchase an item.

Figure 3:
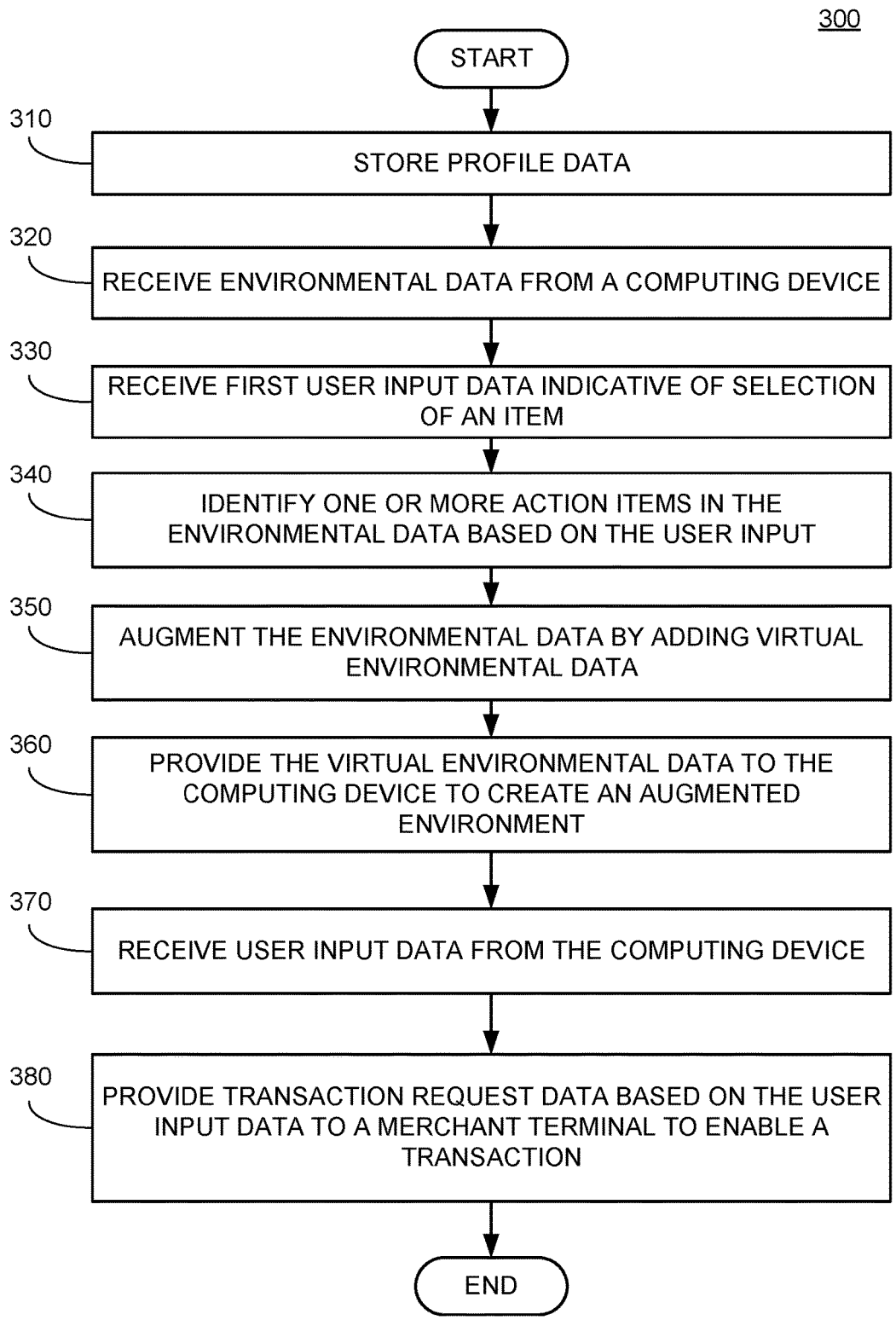
FIG. 3 is a flowchart of an exemplary method for generating an augmented environment and facilitating a transaction.

FIG. 3 shows a flowchart of method 300 for generating an augmented environment and facilitating a transaction. Method 300 may be performed by service provider terminal 110 using processor 210 to execute memory 230. In some embodiments, one or more steps of method 300 may be delegated to other devices or systems in system 100, such as computing device 120, merchant database terminal 140, merchant POS terminal 150 and/or financial service provider terminal 160. Following method 300, user(s) may generate, share, and modify virtually augmented environments.

In block 310, service provider terminal 110 may store profile data. Profile data may include information such as payment credentials and/or user profile information. Profile data may be entered directly by a user (e.g., via computing device 120 or merchant POS terminal 150), or stored on and retrieved from merchant database terminal 140 or financial service provider terminal 160. Payment credentials may include credit card information or financial account information (e.g., which may be associated with financial service provider terminal 160), authentication data (e.g., pin, password, secure gesture, signature, etc.) or other financial information as needed to initiate and authorize a payment, while profile information can include delivery locations, user preferences for clothing or other product sizes and quantities, social network account information (e.g., login credentials and sharing preferences), discounts, wish list preferences, previous purchases and items already owned by a user, marketing and advertising targeting and preferences, and merchant account numbers.

At step 320, service provider terminal 110 may receive environmental data comprising audio and visual information via a computing device associated with the stored profile data (e.g., computing device 120). For example, audio and visual information may be obtained from a built-in or external camera or microphone associated with computing device 120.

At step 330, service provider terminal 110 may receive (e.g., from a computing device associated with the stored profile data, such as computing device 120) first user input data indicative of a selection of one or more items present in the physical environment. According to some embodiments, first user data may be derived from a user input, such as a gesture or audible command detected by computing device 120. For example, a user may select a particular item that the user is viewing in the world (or, in a virtual environment) by providing a selection input. In some embodiments, a selection input may include visually focusing (e.g., such that the item is within the field of view or a particular area of the field of view of a camera associated with computing device 120) on a particular item for more than a predetermined threshold of time. In some embodiments, a user may select a particular item by focusing a camera of, for example, computing device 120 (such as a smart phone or wearable headset), at the item and engaging a predetermined input that may be detected by computing device 120, such as selecting a button, blinking, winking, or issuing a vocal command. In some embodiments, a selection input may include performing a detectable gesture associated with an item. For example, to select an item in a user's field of view, the user may make a grabbing gesture towards the item such that the grabbing gesture may be detected by a camera associated with computing device 120. According to some embodiments, a user may select an item by some combination of inputs to computing device 120. For example, in some embodiments, a user may select an item by visually focusing on the item and simultaneously issuing an audible command that may be detected by computing device 120.

Having received the environmental data and first user input data, at step 340 service provider terminal 110 may identify one or more action items in the visual information of the environmental data based on the first user input data. In some embodiments, the one or more action items may be associated with the one or more selected items. Action items can be identified by recognizing voice or auditory commands (e.g., a person may verbally identify the item and merchant where the item was purchased), shapes, labels, bar codes, QR codes, emitters, RFID tags, IR beacons or Bluetooth™ beacons located in an environment (e.g., POS devices 152, 154, and 156 associated with one or more products or items at a POS location or devices associated with different predefined areas of a closet, refrigerator, pantry, etc. that stores items that are periodically repurchased), or the like. In some embodiments, identifying one or more action items in the environmental data may involve using image recognition techniques. In some embodiments, the service provider terminal 110 may receive one or more 3-dimensional models of the one or more selected items to aid in performing image recognition from, for example, a merchant terminal 150 or merchant database 140. For example, a clothing merchant may provide service provider terminal 110 with 3-dimensional models of a plurality of clothing items to aid service provider terminal 110 in identifying a particular clothing item selected by a user of computing device 120. Action items associated with selected items may include items that a user of the system observes as they move through the world (or through a virtual environment) that they may be interested in purchasing such as clothing items, sports equipment, food items, books, bags, or any other consumer item.

At step 350, service provider terminal 110 may augment the environmental data by adding virtual environmental data. In some embodiments, this augmentation may involve displaying information from a merchant (e.g., who may be associated with merchant database terminal 140 and/or merchant POS terminal 150) that is specific to one of the one or more of the identified action items. For example, service provider terminal 110 may recognize a particular item or product and augment the environment with visual effects such as a price tag, availability of the product and/or products of other brands or sizes, or aesthetic effects such as virtual fireworks, sale signs, and the like. Service provider terminal 110 can connect to an appropriate merchant database terminal 140 to include information relevant to the identified action item. For example, in the event that the identified action item is a clothing item, service provider terminal 110 may connect to a clothing merchant database terminal (e.g., merchant database terminal 140), or in the event that the action item is a food item, service provider terminal 110 may connect to a grocery store database terminal (e.g., merchant database terminal 140).

In block 360, service provider terminal 110 may provide the virtual environmental data to computing device 120 in order to create an augmented environment when viewed in combination with the physical environment. For example, in some embodiments, computing device 120 may be a wearable headset with a visual display (e.g., a heads up display) that may overlay information or images (e.g., derived from the virtual environmental data) on top of objects in the physical environment. In some embodiments, computing device 120 may be a smart phone with a mobile application that, in response to obtaining a photo of an item and identifying the item in the phone (e.g., via service provider terminal 110), may similarly overlay information and images on top of the identified item when shown in the display. In some embodiments, the virtual environment data may include some or all of the environmental data provided by computing device 120. In some embodiments, computing device 120 may only receive the newly generated virtual environmental data. The virtual environmental data may include product price, product inventory information, related products (e.g., other brands, sizes, or models), available discounts, and aesthetic visual effects (e.g., target graphics, glow, highlighted colors, or firework graphics displayed around one or more products to draw attention to a particular item or to convey a message associate with that item, such as being highlighted green for being on sale). Although this disclosure is generally described with respect to use of an augmented environment, it will be understood by those of skill in the art that the system 100 may also operate substantially similarly in a virtual environment.

In block 370, service terminal provider terminal 110 may receive second user input data associated with the one or more action items from computing device 120. In some embodiments, second user input data may be indicative of some action to be taken by the system 100 with respect to one or more action items. For example, second input user data may cause the system 100 to initiate the purchase of a selected item (e.g., for the user or for a third party indicated by the user) or add the selected item to a wish list associated with the user (or otherwise bookmark the selected item for future consideration). Similar to first user input data describe above, second user input data may be derived from a user input, such as a gesture or audible command detected by computing device 120. In some embodiments, the service provider terminal 110 may take some action in response to receiving second user input data derived from a predetermined gesture or command performed by a user. For example, the system 100 may initiate the purchase an item (e.g., by sending a purchase request data to a merchant terminal 150) to be sent to an address associated with the user in response to the user performing a gesture including grabbing at an item. In some embodiments, the system 100 may initiate the purchase of an item to be sent to an address associated with a third party in response to a user performing a gesture that includes grabbing at the item and then making a throwing motion in the direction of the third party. In some embodiments, the system 100 may identify the third party using facial recognition techniques and access an address stored in association with the third party (e.g., service terminal provider terminal 110 may access an address book associated with, for example computing device 120, to determine the address of the identified third party). According to some embodiments, a user or a third party (e.g., a friend of the user) may also be recognized by the system 100 using biometrics (e.g., voice recognition) or proximity assessment (e.g., based on something the third party is wearing or carrying). In some embodiments, the system 100 may add the item to a wish list associated with the user if the user performs a gesture that includes drawing a circle around the item with their finger. It should be recognized that the particular gestures described herein are merely examples and that any conceivable gesture that may be detectable by a computing device 120 may be utilized by system 100.

According to some embodiments, second user input data may be derived from an authenticating gesture. In some embodiments, an authenticating gesture may be a predetermined gesture or input that serves to instruct the system (e.g., service provider terminal 110) to take some action with respect to a selected item/action item (e.g., purchase item, add item to wish list) and to simultaneously verify the identity of the user attempting to initiate the action. For example, an authenticating gesture may be a predetermined gesture such as a user signing their name in the air with their finger or speaking a password or pin. In some embodiments, the service provider terminal 110 may compare the second user input data 110 against stored authentication data to determine if the authenticating gesture input at computing device 120 is within a predetermined threshold level of similarity to a stored authenticating gesture. In some embodiments, the service provider terminal 110 may prevent the execution of a purchase transaction if the authenticating gesture is not determined to be within a predetermined threshold level of similarity to the stored authenticating gesture. According to some embodiments, authenticating gestures may be input, for example, by the user of computing device 120 touching a screen, making a gesture in the visual field of a video capturing component of computing device 120, speaking a command into an audio capturing component of computing device 120, entering an input using a connected input device, or some combination of these. In some embodiments, computing device 120 may be a virtual reality device including a headset and a camera. In such embodiments, the user may be viewing the augmented environment, and may physically reach for an element in that environment to generate second user input data. The second user input data may then be transmitted to service provider terminal 110 (e.g., by computer device 120 via network 130).

In response to receiving the second user input data at block 370, at block 380, service provider terminal 110 may provide transaction request data to the merchant database terminal 140 or merchant POS terminal 150 in order to enable a transaction. In some embodiments, second user input data may correspond with a command to purchase a selected item associated with an action item. In some embodiments, the transaction related to the one or more action items may represent a purchase of the one or more selected items on behalf of a user of the computing device 120. In some embodiments, the transaction related to the one or more action items may represent a purchase of the one or more selected items on behalf of someone other than a user of the computing device, for example, a purchase of a gift for a friend. In some embodiments, second input data may include a selection of a payment method for an item purchase. For example, the second user input data may be the user gesturing to press a virtual "order" button associated with an action item, and service provider terminal 110 may connect to a merchant terminal 150 and provide payment information to complete the transaction with the merchant to order the selected item corresponding to the action item.

In some embodiments, to provide the transaction request data, service provider terminal 110 may transmit a purchase authorization request to financial service provider terminal 160, which may already have user account information associated with computing device 120. Once the request has been authorized, service provider terminal 100 may transmit a purchase request to merchant POS terminal 150 to purchase the identified product(s) or to pay the identified bill(s). Alternatively, in other embodiments, service provider terminal 100 may add the identified products or identified bills to a checkout cart associated with computing device 120 for purchase or payment at another time.

Optionally, in some embodiments, system 100 may facilitate another action in lieu of or in addition to making a purchase. For example, system 100 may allow a user to add a selected item to a "wish list" such that a user may decide to purchase the item at a future time.

Figure 4:
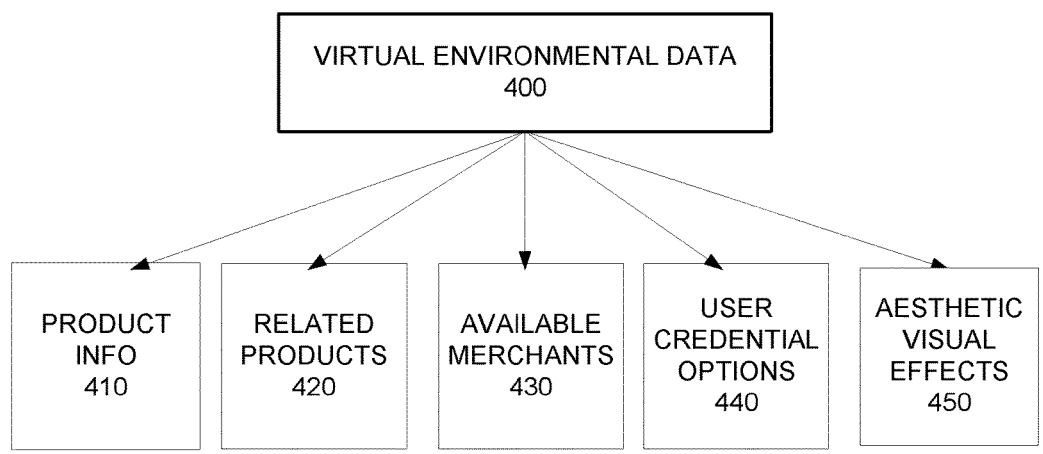
FIG. 4 is a diagram of exemplary types of virtual environmental data.

FIG. 4 shows a diagram that represents an embodiment of exemplary types of virtual environmental data 400. For example, virtual environmental data 400 may include product price information 410, related product information 420, product availability between merchants 430, user credential options 440, or aesthetic visual effects 450. Product information 410 can include, for example, a product price, stocking information, product features, and product reviews. Related product information 420 may include complementary products (e.g. batteries for a device, matching tie for a shirt, etc.) or alternative products (e.g. value-sized items, more highly rated alternatives, comparable brands, etc.). Merchant information 430 can include prices, shipping costs, and availability at various merchants, as well as merchant reviews. User credential options 440 can include individual family member profiles (e.g. this is for mom, dad, or child), credit cards, membership numbers (e.g. loyalty programs, frequent flier accounts, etc.), bank account information, or merchant account passwords. Examples of aesthetic visual effects may include product image graphics, glowing effects, highlighting objects with colors, or animations (e.g. firework graphics, waving flags, etc.).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes one example of a typical user flow pattern. It is intended solely for explanatory purposes and not in limitation. The user may have credit card information and a delivery address stored in the system (e.g., system 100), and may be walking down the street using their mobile device (e.g., computing device 120). The user may see an item that they are interested in purchasing, such as a shirt that a passerby is wearing. The user may select the shirt by, for example, staring at the item for at least 10 seconds, taking a picture, or performing a grabbing motion towards the shirt such that the grabbing motion may be detected by a camera of their mobile device (e.g., computing device 120). The system may then identify the selected shirt by, for example, performing image recognition techniques and comparing images of the item obtained by the mobile device to a database of item (e.g., one or more merchant database terminals 140). Once the system identifies the item, it may provide an augmented environment to the user (e.g., via computing device 120) that may provide information (e.g., visual and/or audible information) about the identified item, such as for example, the price of the item and available merchants from which the shirt may be purchased. The user may then take an action relating to the item, such as purchasing it for themselves, purchasing it as a gift for someone else, or adding the item to a "wish list." Each action may be performed in response to a predetermined gesture. For example, the user may purchase the selected item (e.g., from merchant POS terminal 150) by performing a gesture such as grabbing at the item, at which point the item may be automatically purchased and delivered to the user based on stored financial account information and delivery address. The user may purchase the selected item for a friend by, for example, grabbing at the item and making a motion to "throw" the item towards their friend. The system (e.g., via service provider terminal 110) may recognize the friend using for example, facial recognition, and may purchase the item with the user's stored financial account information and send the item to an address stored in association with the friend. In some cases, the system may include security settings that require user authentication before authorizing a purchase. For example, before allowing the purchase, the user must perform an authenticating gesture, such as signing their name in the air with their finger or performing a user customized gesture or voice command that the system (e.g., via computing device 120) can detect. The system (e.g., via service provider terminal 110) may compare the gesture to a stored gesture, and if the system determines that the gestures match (within some margin of error) then the system will authorize the purchase. It should be understood that although this exemplary use case is described with respect to an augmented environment, this system (e.g., system 100) may operate in a virtual environment as well.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for facilitating a transaction, comprising:
 a memory for storing profile data comprising user payment credentials and user profile information;
 an input/output device for receiving a virtual environmental data signal and an augmented virtual environmental data signal and for transmitting purchase request data to a merchant terminal;
 a display device for displaying a virtual environment and/or an augmented virtual environment in accordance with the virtual environmental data signal and/or the augmented virtual environmental data signal, respectively, wherein the display of the virtual environment is based on virtual environmental data present in the virtual environmental data signal and the display of the augmented virtual environment is based on augmented virtual environmental data present in the augmented virtual environmental data signal;
 an environmental data sensor for obtaining environmental data comprising audio and/or visual information representing a user gesture;
 a user interface device for generating user input data in response to one or more user inputs, wherein the user interface device is configured to generate first user input data indicative of a selection of a virtual item present in the virtual environment based on:
  a first user gesture made in association with the selected virtual item, the first user gesture being detected by the environmental data sensor; and an image of the selected virtual item displayed in the virtual environment by the display device; and an augmented virtual environment processor that, based on the first user input data and the virtual environmental data, is configured to identify one or more action items that are associated with the selected virtual item based on an identification of the selected virtual item using image recognition techniques on the image, augment the virtual environmental data by adding enhanced content associated with the one or more action items, generate the augmented virtual environmental data signal comprising augmented virtual environmental data, and generate purchase request data based on the one or more action items, the user profile information, and second user input data associated with one or more action items generated by the user interface device, wherein the enhanced content is unrepresented in the virtual environment data.

2. The system of claim 1, wherein the second user input data is generated in response to a second gesture indicating an instruction to purchase an item.

3. The system of claim 1, wherein the first user gesture comprises focusing on a virtual item for greater than a predetermined threshold period of time.

4. The system of claim 1, wherein the first user gesture comprises a grabbing motion made towards a virtual item displayed in the virtual environment by the display device.

5. A system for facilitating a transaction, comprising:
one or more processors; and
a memory in communication with the one or more processors and storing instructions that, when executed by the one or more processors, are configured to cause the system to:
store profile data comprising user payment credentials and user profile information;
receive, from a computing device associated with the stored profile data, environmental data comprising audio and visual information, the environmental data representing one or more gestures made by a user associated with the computing device;
provide, to the computing device, virtual environmental data representing a virtual environment, the virtual environment comprising at least one or more virtual items and one or more virtual gestures, wherein the virtual gestures are based on the received environmental data;
receive, from the computing device, first user input data indicative of a selection of one or more virtual items present in the virtual environment, the first user input data being derived from:
an image of the one or more virtual items present in the virtual environment displayed by the computing device; and
a user gesture made in association with the one or more virtual items, the user gesture being represented in the environmental data after being detected by a sensor associated with the computing device and being represented in the virtual environmental data as a virtual gesture;
identify one or more action items in the virtual environmental data based on the first user input data, the one or more action items being associated with the one or more selected virtual items, the identification of the one or more action items being based on an identification of the one or more selected virtual items using image recognition techniques on the image;

augment the virtual environmental data by adding augmented virtual environmental data comprising enhanced content associated with one or more of the one or more action items, wherein the enhanced content is unrepresented in the virtual environment;

provide, to the computing device, the augmented virtual environmental data to create an augmented virtual environment for display by the computing device such that the enhanced content is displayed in association with the virtual environment;

receive, from the computing device, second user input data associated with the one or more action items; and provide, based on the second user input data, the one or more actions items, and the user profile information, purchase request data to a merchant terminal to enable a transaction related to the one or more action items, wherein the purchase request data comprises the stored user payment credentials.

6. The system of claim 5, wherein the transaction related to the one or more action items represents a purchase of the one or more selected virtual items on behalf of a user of the computing device.

7. The system of claim 5, wherein the transaction related to the one or more action items represents a purchase of the one or more selected virtual items on behalf of someone other than a user of the computing device.

8. The system of claim 5, wherein the one or more processors are further configured to execute the instructions to cause the system to receive, from a merchant terminal, one or more 3-dimensional models of the one or more selected virtual items to aid in performing image recognition.

9. The system of claim 5, wherein the first user input data is further derived from an audible command detected by the computing device.

10. The system of claim 5, wherein the user gesture comprises focusing on a virtual item for greater than a predetermined threshold period of time.

11. The system of claim 5, wherein the user gesture comprises a grabbing motion made towards a virtual item displayed in the virtual environment by the computing device.

12. The system of claim 5, wherein the second user input data is derived from an authenticating gesture.

13. A system for facilitating a transaction, comprising:
one or more processors; and
a memory in communication with the one or more processors and storing instructions that, when executed by the one or more processors, are configured to cause the system to:
store profile data comprising user payment credentials and user profile information;
generate, based on virtual environmental data, a signal representative of a virtual environment comprising one or more virtual items;
transmit, to a computing device, the signal for display by the computing device;
receive, from the computing device, an indication of a selection of a virtual item displayed in the virtual environment by the computing device, wherein the indication of the selection is derived from a user gesture detected by a sensor of the computing device and comprises at least an image of the selected virtual item;

identify a real-world item that corresponds to the selected virtual item by performing image recognition techniques on the image;

receive, based on the identification of the real-world item, enhanced content associated with the selected virtual item;

augment the virtual environmental data with the enhanced content to create an augmented signal representative of an augmented virtual environment, wherein the augmented virtual environment is configured to be displayed by the computing device such that the enhanced content is displayed in association with the selected virtual item;

receive, from the computing device, user input data associated with the selected virtual item, the user input data being indicative of an intention to purchase the real-world item corresponding to the selected virtual item; and provide, based on the user input data and the user profile information, purchase request data to a merchant terminal to enable a transaction associated with the real-world item, wherein the purchase request data comprises the stored user payment credentials.

14. The system of claim 13, wherein the transaction associated with the real-world item represents a purchase of the selected virtual item on behalf of a user of the computing device.

15. The system of claim 13, wherein the transaction associated with the real-world item represents a purchase of the selected virtual item on behalf of someone other than a user of the computing device.

16. The system of claim 13, wherein the one or more processors are further configured to execute the instructions to cause the system to receive, from a merchant terminal, one or more 3-dimensional models of the selected virtual item to aid in performing image recognition.

17. The system of claim 13, wherein the indication of the selection is further derived from an audible command detected by the computing device.

18. The system of claim 13, wherein the user gesture comprises focusing on a virtual item for greater than a predetermined threshold period of time.

19. The system of claim 13, wherein the user gesture comprises a grabbing motion made towards the selected virtual item displayed in the virtual environment by the computing device.

20. The system of claim 13, wherein the user input data is derived from an authenticating gesture.

* * * * *